UNITED STATES PATENT OFFICE.

EMIL SCHEITLIN, OF ALTSTETTEN, NEAR ZURICH, SWITZERLAND.

METHOD OF MAKING 1-PHENYL-2.3-DIMETHYL-4-DIMETHYLAMINOPYRAZOLONE.

No. 930,092.  Specification of Letters Patent.  Patented Aug. 3, 1909.

Application filed August 28, 1907. Serial No. 390,477.

*To all whom it may concern:*

Be it known that I, EMIL SCHEITLIN, a citizen of the Republic of Switzerland, residing at Altstetten, near Zurich, Switzerland, have invented certain new and useful Improvements in Methods of Making 1 - Phenyl - 2.3 - Dimethyl - 4 - Dimethylaminopyrazolone; and I do hereby declare the following to be a full, clear, and exact description of the invention, such as will enable others skilled in the art to which it appertains to make and use the same.

My invention relates to the production of 1 - phenyl - 2.3 - dimethyl - 4 - dimethylamino-pyrazolone and has for its object to produce the same pure and directly, without the formation of by products and its subsequent tedious separation therefrom.

I have found that 1-phenyl-2.3-dimethyl-4-dimethyl-amino-pyrazolone can be readily obtained by reacting with dimethyl-sulfate upon 1-phenyl-2.3-dimethyl-4-sulf-aminopyrazolone. The advantages of this method over the usual method of procedure which consists in methylating 1-phenyl-2.3-dimethyl - 4 - amino - pyrazolone lies in the readiness with which the reaction takes place with the 1 - phenyl - 2.3 - dimethyl - 4 - sulf-amino-pyrazolone and the great purity with which the product can be obtained without tedious and expensive separation or treatment. It is important that in the methylating, pure starting materials be used and much depends thereon for the ready reaction. The materials heretofore used as starting materials i. e. 1 - phenyl - 2.3 - dimethyl-4-amino-pyrazolone left much to be desired in this respect, as it could be obtained pure only by means of costly roundabout methods and further that it altered in time. Another advantage of the present process is that the result of the reaction is better than in other processes.

In methylating 1-phenyl-2.3-dimethyl-4-amino-pyrazolone by means of dimethyl-sulfate the reaction takes place very violently so that it is necessary to very carefully add the methylating material in small quantities and even when this is done very slowly there are formed to some extent quarternary ammonium combinations to which the violence of the reaction is attributed. By the use of 1 - phenyl - 2.3 - dimethyl - 4 - sulf - aminopyrazolone the reaction first takes place at a rise of temperature which can readily be regulated until the end of the reaction and the formation of by products does not take place and the reaction proceeds more nearly in accordance with the theory. The reaction is believed to take place as follows—

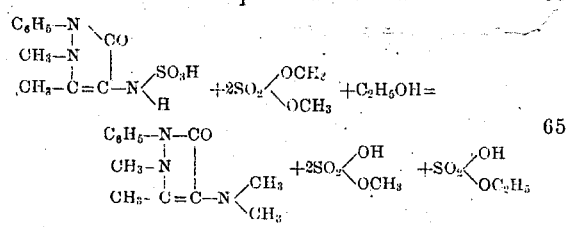

Although it is desirable to use alcohol as a solvent, the reaction may be accomplished without it, there being sufficient moisture adhering to the sulf-amino compound to furnish a molecule of water. The reaction may then be expressed as follows:—

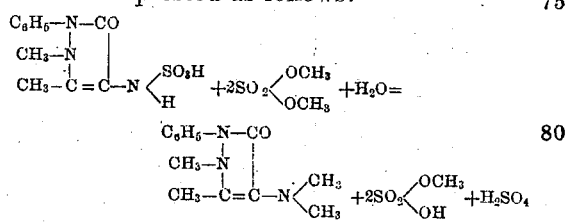

In place of di-methyl sulfate any other suitable methylating substance may be used, such, for example, as methyl-iodid, chlorid and bromid, but I prefer the methyl-sulfate on account of its cheapness. And the reaction without any solvent whatever is presumed to be as follows, the two substances, however, being vigorously stirred:—

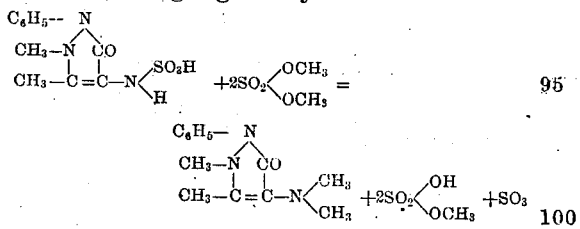

The $SO_3$ is, however, not set free, and what becomes of it and how it combines is not known.

For example to 284 parts of 1-phenyl-2.3-dimethyl-4-sulf-amino-pyrazolone first add 46 parts of alcohol and 252 parts of dimethylsulfate. The mixture is heated from 110° to 115° centigrade and kept at this temperature from three to four hours, the melted product is dissolved in water, made alkaline with sodium or potassium hydrate, and the 1-phenyl-2.3-dimethyl-4-dimethyl-amino-pyrazolone obtained from the solution by means of benzol. By crystallizing the same from its aqueous solution or from its benzol solution, a perfectly pure product is obtained. The treatment with benzol in order to separate the product is as follows. A quantity of benzol is added to the alkaline solution. The benzol floats in a layer thereon, the whole is shaken and the product dissolves in the benzol. The shaken mixture is allowed to stand and the benzol decanted or otherwise separated. This operation is repeated until a sample of the benzol leaves no residue upon evaporation. In practical operations three or four times will be sufficient.

I claim:—

1. In the method of making 1-phenyl-2.3-dimethyl-4-dimethyl-amino-pyrazolone, reacting upon 1-phenyl-2.3-dimethyl-4-sulf-amino-pyrazolone at a temperature above normal by a substance capable of methylating the same.

2. In the method of making 1-phenyl-2.3-dimethyl-4-dimethyl-amino-pyrazolone, reacting upon 1-phenyl-2.3-dimethyl-4-sulf-amino-pyrazolone with dimethyl-sulfate at an elevated temperature until the reaction is complete.

3. The method of making 1-phenyl-2.3-dimethyl-4-dimethyl-amino-pyrazolone, which consists in mixing 1-phenyl-2.3-dimethyl-4-sulf-amino-pyrazolone with alcohol, reacting thereon with dimethyl-sulfate at a temperature between 110° and 115° centigrade, extracting the 1-phenyl-2.3-dimethyl-4-dimethyl-amino-pyrazolone by means of a suitable solvent, and crystallizing the product therefrom.

4. The method of making 1-phenyl-2.3-dimethyl-4-dimethyl-amino-pyrazolone, which consists in mixing 1-phenyl-2.3-dimethyl-4-sulf-amino-pyrazolone with solvent, reacting thereon with dimethyl-sulfate at a temperature between 110° and 115° centigrade, extracting the 1-phenyl-2.3-dimethyl-4-dimethyl-amino-pyrazolone by means of a suitable solvent, and crystallizing the product therefrom.

In testimony that I claim the foregoing as my invention, I have signed my name in presence of two subscribing witnesses.

EMIL SCHEITLIN.

Witnesses:
A. LIEBERKNECHT,
WERNER DIETRICH.